United States Patent

Czarnowski et al.

[11] Patent Number: 6,060,008
[45] Date of Patent: May 9, 2000

[54] PROCESS FOR PRODUCING FRICTION LININGS

[75] Inventors: Klaus-Peter Czarnowski; Fred Gornik, both of Herten, Germany

[73] Assignee: Frimatec Ingenieurgesellschaft mbH, Velbert, Germany

[21] Appl. No.: 09/068,071

[22] PCT Filed: Nov. 16, 1996

[86] PCT No.: PCT/EP96/05042

§ 371 Date: Apr. 28, 1998

§ 102(e) Date: Apr. 28, 1998

[87] PCT Pub. No.: WO97/19277

PCT Pub. Date: May 29, 1997

[30] Foreign Application Priority Data

Nov. 21, 1995 [DE] Germany ............... 195 43 329

[51] Int. Cl.[7] ........................................... D04H 1/20
[52] U.S. Cl. .................. 264/112; 264/120; 264/162; 264/319; 425/112; 425/121; 425/353; 425/407
[58] Field of Search .................. 264/112, 113, 264/120, 129, 319, 162; 425/112, 116, 121, 125, 353, 364 R, 394, 395, 398, 407

[56] References Cited

U.S. PATENT DOCUMENTS

| | | | |
|---|---|---|---|
| 4,191,726 | 3/1980 | Stillhard et al. | 264/157 |
| 4,563,386 | 1/1986 | Schwartz | 428/283 |
| 4,777,003 | 10/1988 | Baiborodov et al. | 264/271.1 |
| 4,900,240 | 2/1990 | Leinweber | 425/110 |
| 4,923,661 | 5/1990 | Russo | 264/119 |
| 4,968,468 | 11/1990 | Leinweber | 264/113 |
| 5,030,075 | 7/1991 | Leinweber | 425/125 |
| 5,132,065 | 7/1992 | Christie | 264/122 |
| 5,641,444 | 6/1997 | Fujikawa et al. | 264/141 |
| 5,895,616 | 4/1999 | Yumoto et al. | 264/69 |

FOREIGN PATENT DOCUMENTS 100233  2/1984  European Pat. Off. .

*Primary Examiner*—Angela Ortiz
*Attorney, Agent, or Firm*—Herbert Dubno

[57] ABSTRACT

In a process for producing friction linings, a friction material is produced in granular form in a mixing reactor (1). The granular material is pressed for up to 120 seconds together with lining bases in press moulds (3) to produce friction linings. Immediately after leaving the press moulds, the finished pressed friction linings are hardened in a continuous furnace (5) for a predetermined period without being fixed. The friction linings are conveyed between the press moulds (3) and continuous furnace (5) on a continuous conveyer (4).

18 Claims, 1 Drawing Sheet

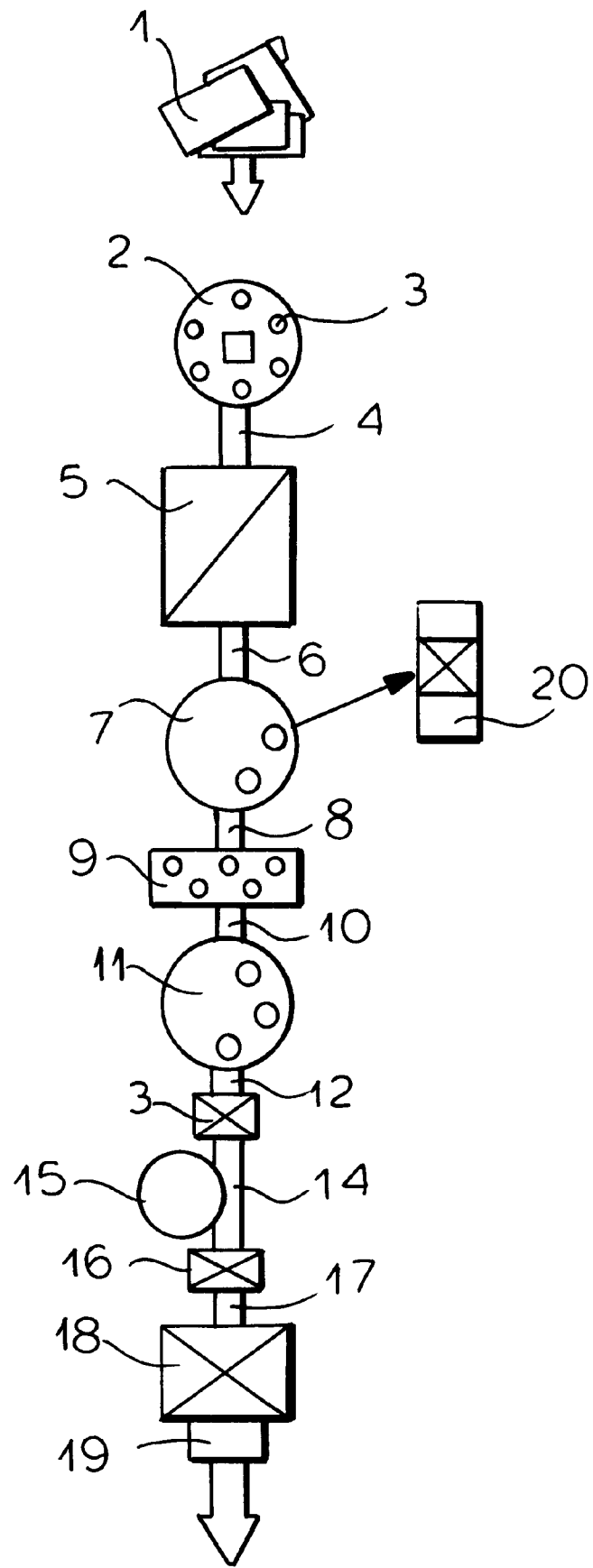

PROCESS FOR PRODUCING FRICTION LININGS

CROSS REFERENCE TO RELATED APPLICATIONS

This application is a national stage of PCT/EP96/05042 filed Nov. 16, 1996 and based, in turn, upon German national application 195 43 329.7 of Nov. 21, 1995 under the International Convention.

FIELD OF THE INVENTION

The invention relates to a process for the manufacture of friction linings, for example disc brake linings for lorries, drum brake linings for passenger vehicles and lorries, clutch linings, industrial linings and railway linings.

BACKGROUND OF THE INVENTION

In a known process for making such linings, after the friction composition mixture has been mixed, the friction linings are manufactured in separate individual steps with interruptions being provided in the manufacturing process for storage times. The friction composition material is mixed from the raw materials in one or more stages. The friction composition mixture is given the intended shape in a compression mold or by another suitable method. The compressed friction linings are cured in a curing oven. The friction linings are finished by grinding, drilling and the like. After-treatment of the surface of the manufactured friction linings by means of heat is also possible. Such after-treatment may then be followed by lacquering, quality control, packaging, etc.

In the known processes, the succession of individual process steps, which are separate from one another in time, results in a relatively long processing time for the friction linings. The heating processes that are required lead to a high energy outlay, especially since the friction linings are cooled to room temperature again after each individual process step. In addition, transportation of the friction linings involves a not inconsiderable outlay in terms of work.

OBJECT OF THE INVENTION

It is an object of the invention to provide a process for the manufacture of friction linings that runs continuously as a process line without any interruption in the flow of material, so that the processing time is considerably shortened.

SUMMARY OF THE INVENTION

This object is attained according to the invention in a process for the manufacture of friction linings in which a friction composition is prepared in the form of a granular material in a mixing reactor, the granular material is compressed in a compression molds for up to 120 seconds with a support composition and lining supports to form friction linings and, immediately after leaving the compression molds, the finished compressed friction linings is cured for a given period of time in a continous oven, without being restrained, the friction linings being transported between the compression molds and the continuous travel oven on a continuous conveyor means. According to the invention, a continuous manufacturing line is produced using known and specially designed devices and apparatuses, the hitherto customary processing time of a friction lining being considerably shortened as a result.

In addition, because the friction linings are exposed during their manufacture to precisely defined process parameters for precisely defined periods of time, the spread of the manufacturing tolerances becomes considerably narrower. The principal difference as compared with the conventional process known from the prior art for manufacturing friction linings is that, according to the invention, the friction linings are manufactured in a process that can be regulated and that proceeds in a controlled manner from beginning to end. By adjusting the given process parameters at each process step, for example at mixing, metering, compression, the obtainable and given qualitative process product can be planned within narrow tolerances. Because the process proceeds in a closed and continuous manner, it is possible to ensure higher quality and uniformity of the manufactured friction linings. In contrast to the conventional processes for the manufacture of friction linings, it is no longer possible that a deviation from the given quality of the friction linings will be detected only after expensive tests have been carried out.

When introducing the friction composition into the mixing reactor it is unimportant in the case of the process according to the invention whether the friction composition is introduced into the mixing reactor in the form of a finished pre-product or whether precursors or even raw materials are used. The granular material can be prepared by using solvents, liquid resins or other binders or by melting together the constituents of the friction composition under the action of heat. Only the use of granular material in the further process for the manufacture of friction linings allows the subsequent process steps to be carried out in accordance with the invention. On the basis of a precise determination of the properties of the granular material, which in the case of this material can be carried out comparatively easily, it is possible to select control values for the subsequent process steps for adjusting the process parameters in the subsequent process steps. In determining the qualitative properties of the granular material, the particle and grain characteristics, for example, of the granular material are important, and those characteristics can, moreover, be adjusted within a particular bandwidth. On the basis of the values determined therefor it is possible to select the time, the temperature and the pressure for the shaping of the granular material in the compression molds and for the curing of the finished compressed friction linings in the continuous travel oven.

Advantageously, in the process according to the invention for the manufacture of friction linings, the amount of energy used is reduced and optimized as far as possible. The sequence of the individual process steps is such that the resulting temperature differences during the process steps are as small as possible so that the minimum amount of energy is required for heating and cooling the friction linings that are to be manufactured. Furthermore, a considerable energy saving is achieved as a result of the fact that—in contrast to conventional processes for the manufacture of friction linings—fixing devices or oven supports do not also have to be heated. In contrast to processes known from the prior art for the manufacture of friction linings, the manufacturing time for a friction lining can be reduced to approximately one hour in the case of the process according to the invention.

Because the process parameters can be adapted in the process according to the invention for the manufacture of friction linings, the properties and qualities of the friction linings that are to be or are manufactured can be adapted to changing requirements to the greatest extent. For example, the recipe for the friction composition or the granular material can be changed in a simple manner, there advantageously being used a component recipe with a first part being rubber constituents, a second part being fiber constituents and a third part being substances affecting the coefficient of friction. The friction composition mixture can consist of variable parts by weight of the individual parts. Simply by varying the parts slightly, it is possible to adapt the friction lining to be manufactured to changed requirements. In so doing, modification of the composition of the first, second or third part may be dispensed with.

With a comparatively low outlay in terms of technical construction, existing production installations for the manufacture of friction linings can be adapted to the process according to the invention.

In one form of the process according to the invention, which is to be used especially for the manufacture of disc brake linings, the granular material is compressed in the compression molds with the support composition and the lining supports and the finished compressed friction linings are cured in the continuous travel oven for approximately 35 minutes and, downstream of the continuous oven, are subjected to specifiable pressure and temperature conditions in a specifiable time cycle in scorch compression stations arranged one behind the other, the friction linings being transported between the through-type oven and the scorch compression stations on a continuous conveyor means. The pressure and temperature conditions prevailing in the scorch compression stations can be varied taking into consideration already known qualities and properties of the finished compressed friction linings.

The granular material and, where appropriate, the support composition are advantageously metered into the compression molds automatically, the lining supports likewise being fed to the compression molds automatically.

Alternatively, it is also possible for pre-pressed pieces consisting of the friction composition and, where appropriate, the support composition and the lining supports to be fed to the compression molds.

A not inconsiderable amount of energy is saved if the finished compressed friction linings are fed into the continuous travel oven substantially at the temperature at which they leave the compression molds.

The cured friction linings can advantageously be ground to their final thickness downstream of the continuous travel oven and upstream of the scorch compression stations, where present. Downstream of the scorch compression stations that may be present it is then possible in a simple manner to grind grooves and/or bevels into the friction linings.

Furthermore, in an advantageous embodiment of the process according to the invention the friction linings are lacquered downstream of the scorch compression stations that may be present. For lacquering purposes the surface of the lining support is sand blasted, which cleans and prepares the surface of the lining support; subsequently, the friction linings are advantageously brought to the given lacquering temperature, after which the surfaces of the lining supports are coated with lacquer; the lacquer is then dried or cured and the friction linings are subsequently cooled.

An apparatus according to the invention for the manufacture of friction linings has a mixing reactor in which friction composition can be prepared in the form of a granular material, a press with compression molds in which the granular material can be compressed for up to 120 seconds with in each case a lining support to form friction linings, a continuous travel oven in which the finished friction linings compressed in the compression molds can be cured for a given period of time without being restrained, and a continuous conveyor means that is arranged between the press and the continuous travel oven. With the apparatus according to the invention for the manufacture of friction linings, the advantages and effects described in connection with the process according to the invention can be achieved.

Where the apparatus is so designed that the granular material can be compressed in its compression molds with the support composition and in each case a lining support and the given period of time can be adjusted to approximately 35 minutes, there being provided downstream of the continuous travel oven scorch compression stations that are arranged one behind the other and in which the friction linings cured in the through-travel oven can be subjected to specifiable pressure and temperature conditions in a specifiable time cycle, and a continuous conveyor means being arranged between the continuous travel oven and the scorch compression stations, the apparatus according to the invention can advantageously be used especially for the manufacture of disc brake linings.

A particularly advantageous form for the mixing reactor has proved to be an inclined plate vacuum mixer.

The press may advantageously be in the form of a rotary table press, the compression time being up to 120 seconds. The machine cycle of the rotary table press is, for example, 7.5 seconds in the case of disc brake linings for passenger vehicles. The number of compression molds required in the case of the rotary table press is then given by the compression time that is to be provided.

A grinding apparatus is advantageously provided downstream of the continuous travel oven and upstream of the scorch compression stations, where present, by means of which grinding apparatus the friction linings cured in the continuous travel oven can be ground to their final thickness.

The scorch compression stations are arranged in a row one behind the other. The friction linings pass through the individual scorch compression stations in succession and, according to the desired qualities and properties, are subjected to defined pressure and temperature conditions in a particular specifiable time cycle.

Downstream of the scorch compression stations that may be present there is arranged a further grinding apparatus by means of which grooves and/or bevels can be ground into the friction linings.

According to a further development of the apparatus according to the invention there is arranged downstream of the scorch compression stations a lacquering installation in which the friction linings can be coated with lacquer. Upstream of the lacquering installation there are advantageously provided a sand-blasting installation, in which the surfaces of the lining supports can be cleaned and prepared, and a cooling stretch, in which the friction linings can be brought to a specifiable lacquering temperature, and downstream of the lacquering installation there are advantageously provided a drying oven, in which the lacquer applied to the surfaces of the lining supports can be cured or dried, and a cooling module, in which the friction linings can be cooled.

Advantageously, and in order to ensure a continuous process for the manufacture of friction linings, continuous conveyor means are provided between the individual processing stations and apparatuses, by means of which continuous conveyor means a continuous stream of friction linings is maintained. Discontinuous transportation procedures between the individual processing stations and apparatuses, which are associated with additional work, are thus avoided.

BRIEF DESCRIPTION OF THE DRAWING

The invention is explained in greater detail below by means of an exemplary embodiment and with reference to the drawing, the sole FIGURE of which shows diagrammatically the sequence of a process according to the invention and an apparatus according to the invention for the manufacture of disc brake linings.

SPECIFIC DESCRIPTION

First, a friction composition in the form of a granular material is prepared in an inclined plate vacuum mixer 1. The granular material is prepared from an adjustable part rubber constituents, an adjustable part fiber constituents and an adjustable part substances affecting the coefficient of friction. The granular material so prepared is non-dusty and pourable.

The granular material is metered automatically into compression molds 3 of the rotary table press 2 by means of suitable feed devices, which may include silos provided at the press in the form of a rotary table press 2. The same applies to the support composition required for the friction lining.

The lining supports are also fed automatically to the compression molds 3.

The compression time in the compression molds 3 is up to 120 seconds, depending upon the composition of the support composition and the friction composition. The machine cycle of the rotary table press 2 is, for example, 7.5 seconds; the number of compression molds required is determined by the compression time to be provided.

The finished compressed friction linings move from the compression molds 3 onto a first continuous conveyor means 4 which feeds them to the entrance to a continuous travel oven 5, into which the finished compressed friction linings then enter approximately at the temperature at which they leave the compression molds 3. The finished compressed friction linings remain in the continuous travel oven 5 for approximately 35 minutes; they are conveyed through the through-type oven 5 in a free and unrestrained manner.

Associated with the exit from the continuous travel oven 5 is a second continuous conveyor means 6 which transfers the friction linings cured in the continuous travel oven 5 to a grinding apparatus 7 in which the cured friction linings are ground to their final thickness by means of suitable grinding tools.

When the apparatus according to the invention and the process according to the invention are to be used in the manufacture of drum brake linings, the grinding apparatus 7 has suitable grinding tools and a drilling device, by means of which the drum brake linings are finished.

After the grinding process, the friction linings so processed pass to a third continuous conveyor means 8 which transfers the friction linings to a number of scorch compression stations 9 arranged in a row one behind the other. The friction linings pass in succession through the scorch compression stations 9 arranged one behind the other and, depending upon the desired qualities and braking characteristics, are subjected to defined pressure and temperature conditions in a specific time cycle.

A fourth continuous conveyor means 10 receives the friction linings from the last scorch compression station 9, as seen in the direction of movement, and transfers the friction linings so treated to a further grinding apparatus 11 in which desired grooves and/or bevels are ground into the friction linings.

A fifth continuous conveyor means 12 receives the ground friction linings from the grinding apparatus 11 and transfers them to a sand-blasting installation 13 arranged upstream of a lacquering installation 16. In the lacquering installation 16, the friction linings are coated. To that end, the sand-blasting installation 13 is arranged upstream of the lacquering installation 16, in which sand-blasting installation 13 any compression and grinding burs are removed and the surfaces of the lining supports are prepared for the application of the lacquer.

The sand-blasting installation 13 is followed by a cooling stretch 15 in which the friction linings so pretreated are cooled to the correct lacquering temperature on a sixth continuous conveyor means 14.

The cooling stretch 15 is followed by the actual lacquering installation 16 in which the lacquer is applied to the surfaces of the lining supports.

From the lacquering installation 16, the friction linings pass by means of a seventh continuous conveyor means 17 into a drying oven 18 in which the lacquer on the linings is cured or dried.

The drying oven 18 is followed by a cooling module 19 in which the friction linings are cooled for further handling.

It is advantageous to provide a grinding dust collection device 20 in which the grinding dust can be collected by type and prepared for recycling. It is thus possible, even in the case of original equipment qualities, to recycle a portion of the material again.

What is claimed is:

1. A process for the production of friction linings, comprising the steps of:

(a) preparing a granular material from a friction composition in a mixing reactor;

(b) compressing the granular material in compression molds in periods of up to 120 seconds together with at least one of a support composition and a lining support to form compressed friction linings and then discharging the compressed friction linings from said compression molds;

(c) immediately upon discharge of the compressed friction linings from said compression molds, advancing said compressed friction linings from said compression molds to a continuous travel oven on a continuous conveyor;

(d) curing said compressed friction linings by passing them unconstrained through said continuous travel oven for a given period of time sufficient to cure the compressed friction linings to hardened friction linings; and (e) thereafter subjecting said hardened friction linings to scorch compression in a succession of scorch compression ovens arranged one behind another under predetermined pressures and temperatures in predetermined time cycles.

2. The process defined in claim 1 wherein said compressed friction linings are passed unconstrained through a continuous travel oven for approximately 35 minutes and are transported between said continuous travel oven and said scorch compression oven on a continuous conveyor.

3. The process defined in claim 1 wherein said granular material is prepared in step (a) by combining rubber fibers of substances affecting a coefficient of friction of the friction linings of variable proportion.

4. The process defined in claim 3 wherein the granular material is metered into said molds automatically and said lining supports are fed automatically to said molds.

5. The process defined in claim 1, further comprising the step of forming prepressed pieces of said granular material and feeding in step (b) the prepressed pieces of said granular material to said compression molds.

6. The process defined in claim 1 wherein said compressed friction linings are fed into said continuous travel oven at substantially a temperature at which said compressed friction linings are discharged from compression molds.

7. The process defined in claim 1, further comprising the step of grinding said hardened friction linings to a final thickness between said continuous travel oven and said scorch compression oven.

8. The process defined in claim 1, further comprising the step of grinding a groove or bevel into the friction linings downstream of said scorch compression oven.

9. The process defined in claim 1, further comprising the step of coating the friction linings with lacquer downstream of the scorch compression ovens.

10. The process defined in claim 9 wherein, prior to coating with lacquer, a surface of a lining support carrying the granular material is sandblasted, the friction lining is brought to a lacquering temperature, the surface of the lining support is coated with lacquer, the lacquer is dried and the friction lining is cooled.

11. An apparatus for producing friction linings, comprising:
- a mixing reactor for preparing a granular material from a friction composition;
- a press having a multiplicity of compression molds downstream of said mixing reactor for compressing the granular material in said compression molds together with at least one of a support composition and a lining support to form compressed friction linings;
- a first continuous conveyor for advancing the compressed friction linings discharged from said compression molds in a downstream direction;
- a continuous travel oven positioned to directly receive the compressed friction linings from said first continuous conveyor for curing the compressed friction linings upon passing of the compressed friction linings unconstrained through the continuous travel oven for a period of time sufficient to cure the pressed friction linings to hardened friction linings;
- a second continuous conveyor extending downstream from said continuous travel oven for conveying the hardened friction linings away from said continuous travel oven; and
- a succession of scorch compression ovens arranged one behind another and receiving hardened friction linings from said second continuous conveyor and subjecting the hardened friction linings to predetermined pressures and temperatures in predetermined time cycles.

12. The apparatus defined in claim 11 wherein said mixing reactor is an inclined plate vacuum mixer.

13. The apparatus defined in claim 11 wherein the press is a rotary table press.

14. The apparatus defined in claim 11, further comprising a grinder between said continuous travel oven and said scorch compression ovens for grinding said compressed friction linings to a final thickness.

15. The apparatus defined in claim 11, further comprising a grinder for grinding a groove or bevel into friction linings downstream of said scorch compression ovens.

16. The apparatus defined in claim 11, further comprising a lacquering unit downstream from said scorch compression stations for coating the friction linings with lacquer.

17. The apparatus defined in claim 16 wherein said unit comprises a sandblaster for cleaning and preparing surfaces of the lining supports, a cooling stretch in which the friction linings are brought to a lacquering temperature, a curing oven in which lacquer applied to said surfaces is cured and a cooler in which the friction linings are cooled after curing of the lacquer.

18. A process for the production of friction linings, comprising the steps of:
- (a) preparing a granular material from a friction composition in a mixing reactor;
- (b) compressing the granular material in compression molds in periods of up to 120 seconds together with at least one of a support composition and a lining support to form compressed friction linings and then discharging the compressed friction linings from said compression molds;
- (c) immediately upon discharge of the compressed friction linings from said compression molds, advancing said compressed friction linings from said compression molds to a continuous travel oven on a continuous conveyor;
- (d) curing said compressed friction linings by passing them unconstrained through said continuous travel oven for a given period of time sufficient to cure the compressed friction linings to hardened friction linings;
- (e) thereafter subjecting said hardened friction linings to scorch compression in a succession of scorch compression ovens arranged one behind another under predetermined pressures and temperatures in predetermined time cycles; and
- (f) grinding grooves and bevels into said friction linings downstream of the scorch compression ovens.

* * * * *